United States Patent [19]

Thebault

[11] Patent Number: 4,459,014

[45] Date of Patent: Jul. 10, 1984

[54] SUBTRACTIVE FILTER FOR THE PRINTING OF COLOR PHOTOGRAPHIC FILM

[75] Inventor: Claude Thebault, Meylan, France

[73] Assignee: Kis France, Grenoble, France

[21] Appl. No.: 362,121

[22] Filed: Mar. 26, 1982

[30] Foreign Application Priority Data

Apr. 3, 1981 [FR] France ................ 81 06900

[51] Int. Cl.³ .................... G03B 27/73; G02B 5/22
[52] U.S. Cl. ..................... 355/32; 355/71; 350/313; 350/315; 362/281; 362/293
[58] Field of Search ............. 355/38, 32, 77, 71, 355/35; 362/268, 277, 283, 293, 319, 321, 297, 281; 354/245, 246; 350/311, 313, 316, 318; 74/567, 569; 430/7, 507, 511, 357, 369, 245, 321; 353/84; 356/402, 403, 404, 419

[56] References Cited

U.S. PATENT DOCUMENTS

| | | | |
|---|---|---|---|
| 2,682,801 | 7/1954 | Davidson | 350/316 |
| 3,027,801 | 3/1962 | Simmon | 356/404 |
| 3,049,051 | 8/1962 | Debrie | 355/35 |
| 3,100,419 | 9/1963 | Clapp | 356/404 |
| 3,684,371 | 8/1972 | Weisglass et al. | 355/71 |
| 3,756,712 | 9/1973 | Weisglass et al. | 355/32 |
| 3,825,337 | 7/1974 | Lucas | 350/316 |
| 3,880,519 | 4/1975 | Barbieri | 355/38 |
| 4,018,527 | 4/1977 | Bartel et al. | 355/71 |
| 4,168,904 | 9/1979 | Furukawa | 355/71 |
| 4,191,466 | 3/1980 | Gandini | 355/71 |
| 4,257,086 | 3/1981 | Gulliksen | 362/279 |
| 4,319,834 | 3/1982 | Terrill | 355/38 |
| 4,362,383 | 12/1982 | Yonehara et al. | 355/71 |
| 4,408,873 | 10/1983 | Labrum | 355/38 |

FOREIGN PATENT DOCUMENTS

| | | | |
|---|---|---|---|
| 1219275 | 5/1960 | France . | |
| 2200976 | 7/1974 | France . | |
| 2381332 | 9/1978 | France . | |
| 88482 | 2/1937 | Sweden | 355/71 |
| 878298 | 9/1961 | United Kingdom | 355/38 |
| 481013 | 7/1973 | U.S.S.R. | 355/38 |

*Primary Examiner*—Donald P. Walsh
*Assistant Examiner*—David Kent Cornwell
*Attorney, Agent, or Firm*—Parkhurst & Oliff

[57] ABSTRACT

A subtractive filter having three elementary filters, each comprising a fixed cylindrical central portion having at its center a channel for the passage of the light and on its surface a radial milled slot; a rotary ring concentric to the said fixed cylindrical central portion having a graduation on its central periphery, the inside of said rotary ring having the shape of a logarithmically progressive ramp; and a filter holder comprising a frame adapted to slide in the said radial milled slot in the fixed cylindrical central portion, the bottom of said frame having the shape of a rounded point which rests against said ramp and the top of said frame having a spring resting against a part fastened to the periphery of the fixed central portion, said frame of said filter holder comprising at its top a window opening and at its bottom the filter. Regulation of light passing through each of the three filters is accomplished by rotating the rotary rings.

11 Claims, 4 Drawing Figures

SUBTRACTIVE FILTER FOR THE PRINTING OF COLOR PHOTOGRAPHIC FILM

BACKGROUND

The present invention relates to a new type of filter for the printing of color photographic films.

As is known in the art, a subtractive filter is a device formed of three filters, each colored in one of the three complementary colors (yellow, magenta, cyan) arranged in the beam of light coming from a source of white light and adapted to correct the dominances of colors coming either from said light or from the use of different printing processes, films or papers. Each of these three filters is adjusted as a function of the density of light which is desired. As is known, this density d is equal to:

$$d = \log T/1$$

in which T is the transmission of the light. It follows therefore, if d=0 there is maximum transmission since there is no filtering. It also follows that the more the density increases the more the light is filtered. In practice, the filtering is generally limited to a value of approximately 1.4.

Because such subtractive filters are well known in the art they will not be described in detail. At present there are several types of filters of very different construction; each of which has its advantages and its drawbacks, including in particular the device disclosed in U.S. Pat. No. 4,168,904.

SUMMARY OF THE INVENTION

The present invention relates to a new type of subtractive filter for the printing of color photographic films, comprising three elementary filters which are individually adjustable and through which the light to be filtered passes. Each elementary filter comprises:

a fixed cylindrical central portion having at its center a rectangular channel for the passage of the light and a radial, milled slot on its surface, a rotary ring concentric with the said fixed cylindrical central portion having a graduation on its circular periphery and a logarithmically progressing ramp on its inside;

a filter holder formed of a frame adapted to slide in the radial, milled slot of the fixed cylindrical central portion; the bottom of said filter holder having the shape of a rounded point which rests against the logarithmically progressive ramp and the top of said filter holder having a spring which rests against a part fastened to the periphery of the fixed cylindrical central portion, the frame of this filter holder having a window opening within its top portion and the filter within its bottom portion.

Advantageously, in practice, the difference in pitch of the logarithmically progressive ramp when a complete revolution of the turning ring has been accomplished corresponds substantially to the height of the rectangular channel for the passage of the light in the fixed cylindrical central portion so that an operator may either let all of the white light pass into this channel or filter it out almost completely. The fixed cylindrical central portions are located so that two of the three faces of the fixed cylindrical central portions containing the milled slots rest on the opposite face of the adjacent fixed cylindrical central portions.

Each fixed cylindrical central portion has, rigidly connected thereto, a cylindrical base having a diameter corresponding substantially to the diameter of the rotary ring. The three elementary filters are arranged adjacent each other by fastening screws which pass through the fixed cylindrical central portions so that one side of each filter holder rests against the front face of a corresponding fixed cylindrical central portion and within the milled slot provided for the filter holder, and the other side of each filter holder rests against the rear face of the adjacent fixed cylindrical central portion of the preceding filter and, more precisely, against the cylindrical base which is rigidly connected to said fixed cylindrical central portion. The filter assembly formed by these three elementary filters is associated on the one side with an exposure lamp and on the other side with a light diffuser. The light diffuser is formed of curved disks adapted to make the light flux homogeneous over its entire cross section. The lamp/filter-element/diffuser assembly has, on the diffuser side, pins which make it possible to attach it a lens and through which the electric current for the operation of the lamp passes.

BRIEF DESCRIPTION OF THE DRAWINGS

The manner of implementing the invention and the ensuing advantages will be better understood in relation to the following illustrative example and the attached figures, without thereby implying limitation.

DETAILED DESCRIPTION

Figure 1:
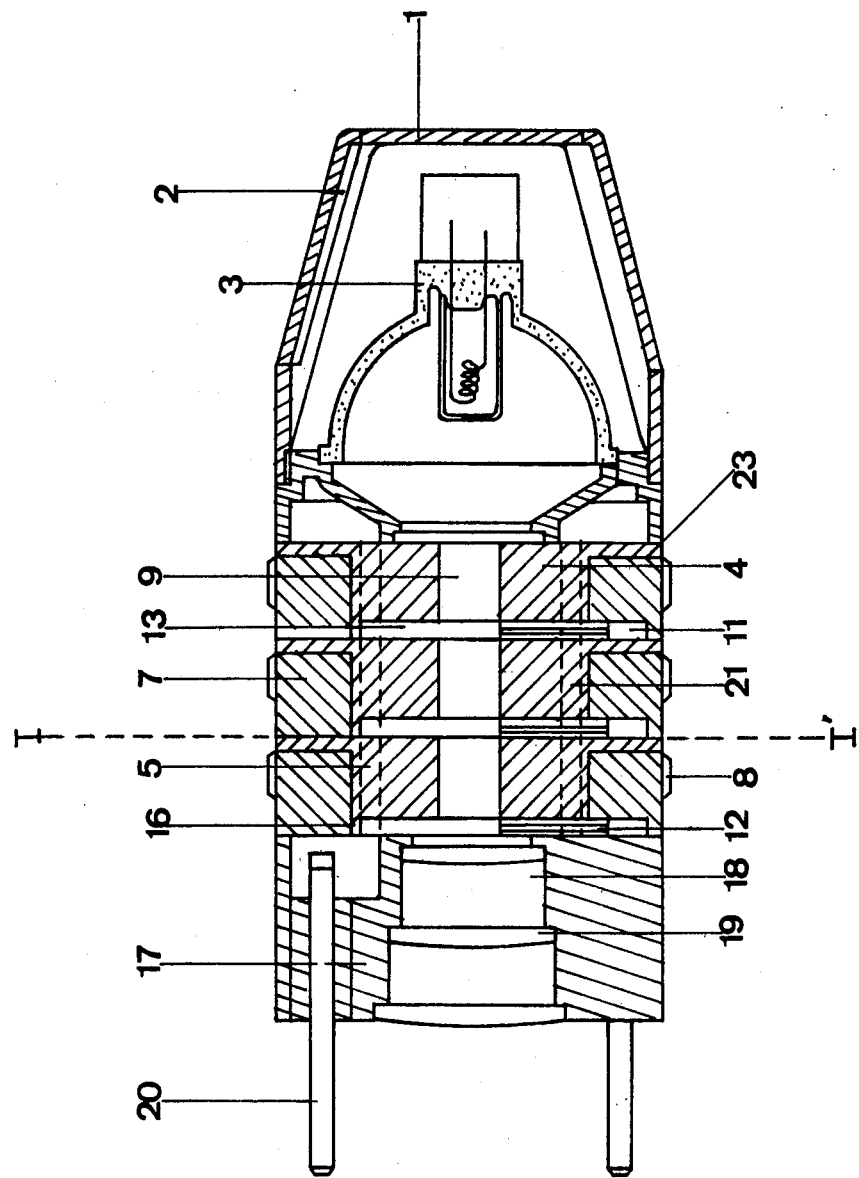
FIG. 1 is a cross sectional view of a lamp-filter-diffuser assembly in accordance with the invention.
Figure 2:
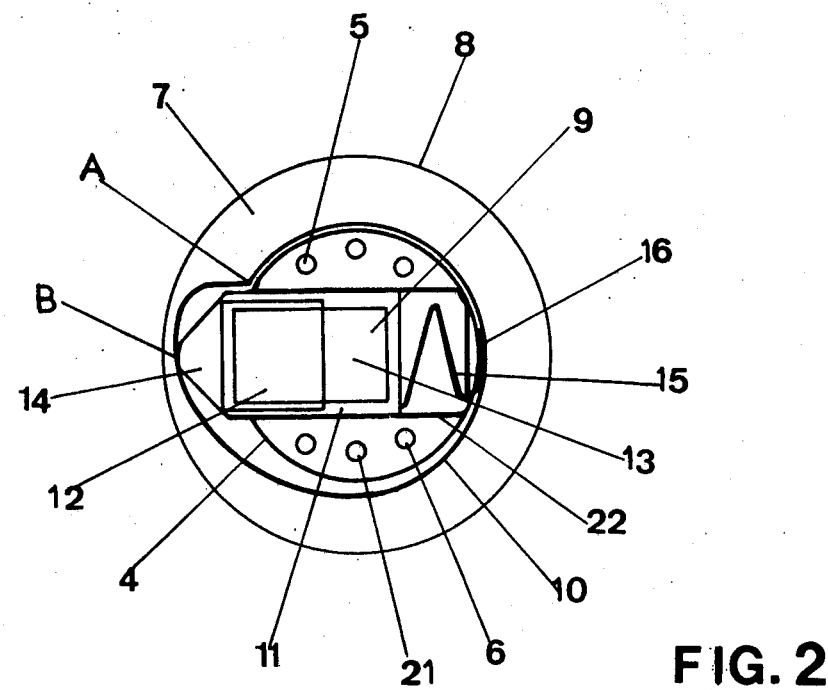
FIG. 2 is a cross sectional view taken along the line I—I' of FIG. 1.
Figure 3:
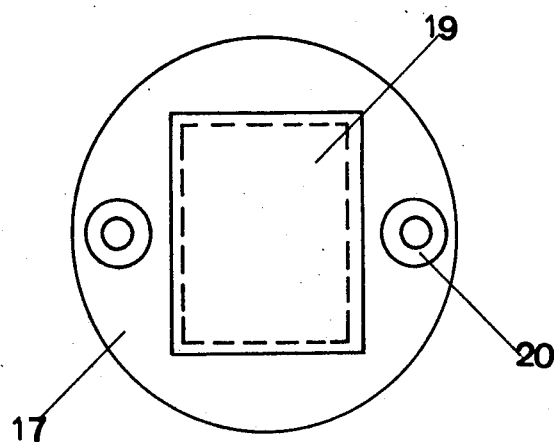
FIG. 3 is a side view of the outlet of the diffuser.

Referring to FIG. 1, the exposure lamp comprises a hood 1 (which can, for example, be made of aluminum) within which aeration slits 2 are provided, and an exposure lamp 3 (which can be, for example, a Sylvania 100 W quartz-halogen lamp).

Figure 4:
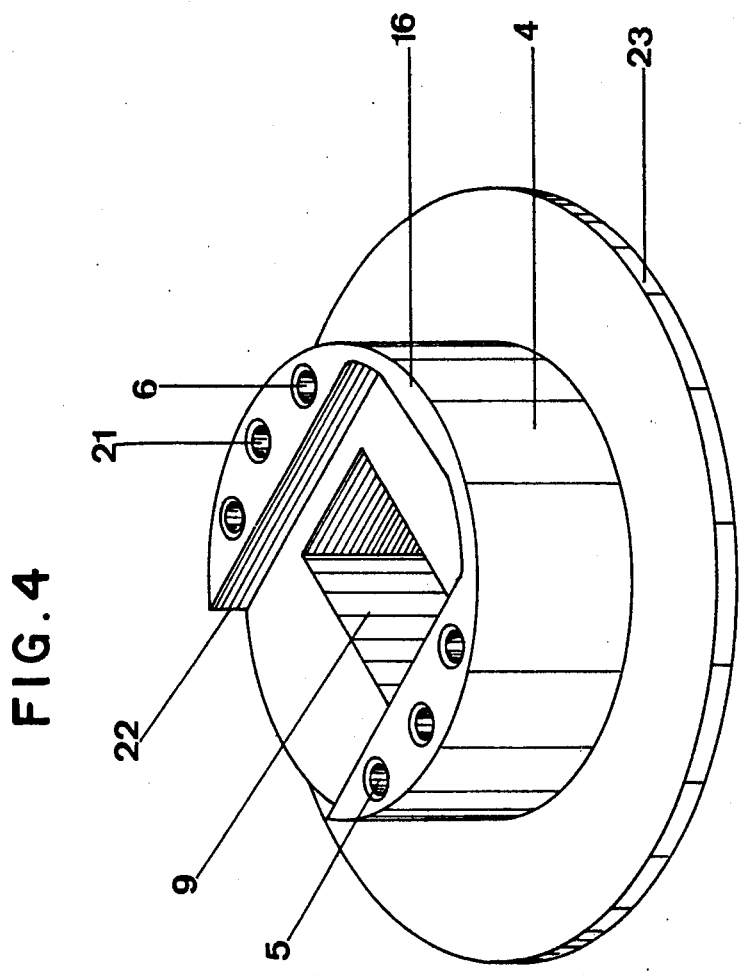
FIG. 4 is a perspective view of the fixed central portion.

The filter assembly is composed of three identical elementary parts held together and made integral with the hood 1 by attachment screws or the like which fit into holes 5 and 6. Each elementary part comprises a fixed cylindrical central portion 4 ( as shown in FIG. 4) having at its center a rectangular channel 9 for the passage of the white light coming from the lamp 3. Each fixed cylindrical central portion 4 is integrally connected to a base 23 which extends to the periphery and bears a setting mark. Each fixed cylindrical central portion 4 is provided on the face opposite said base 23 with a milled slot adapted to receive the filter holder and having at one end a bearing part 16 for receiving the spring 15, in the form of a secant circular sector. Each elementary part also includes a rotary ring 7 having on its circular periphery graduations 8 ranging, for example, from 0 (for total transmission of the light since the corresponding filter is not positioned at all within channel 9) to 140 (for minimum transmission of the light since the corresponding filter covers practically all of channel 9). The inner part of these rotary rings 7, which are concentrically located relative to the fixed cylindrical central portion 4, has the shape of a logarithmically progressive ramp 10 wherein the starting point A of this ramp coincides with the graduation 140, i.e., at point A the radius of the ramp 10 is scarcely greater than the radius of the fixed cylindrical central portion 4, and the end point B coincides with the graduation 0, i.e., at point B the radius of the ramp 10 is substantially equal to the sum of the radius of the cylindrical fixed central portion 4 plus the height of the channel 9. Also included in each elementary part is a filter holder whose width and height corresponds substantially to those of the milled slot and wich comprises a rectangular frame 11 having a lower portion into which the filter 12 is placed and the upper portion 13 of which forms a window opening. A round point 14 is rigidly connected with the frame 11 and is adapted to abut the logarithmically progressive ramp 10. A spring blade 15 of a predetermined calibrated pressure rests against a part 16 attached for this purpose to the end of the milled slot 22 of the fixed cylindrical central portion 4. The length of the assembly formed by the frame 11, rounded point 14 and compressed spring 15 is substantially equal to the length of milled slot 22.

One problem encountered with the above construction is that light coming from the filter assembly is filtered at the bottom of the channel 9 while the white light is transmitted at the top. It is therefore important to mix the white and filtered light. To accomplish this in a conventional manner, a diffuser is placed against the filter element of the invention which comprises essentially a fixed hollow body 17 that is attached to the filter assembly and the lamp by the screws or the like which fit into holes 5, 6. This hollow body of divergent conicity has three diffusion stages 18, each comprising a diffuser disk 19 of translucent plastic material, curved to make the luminous flux homogeneous throughout the entire section.

The front face of the hollow body 17 has two pins 20 adapted to: (1) attach the assembly to the optical portion (lens plus shutter); and (2) assure the passage of the electric current for the lamp 3 through wires arranged within the conduit 21 which is drilled in the cylindrical central portion 4.

All the parts, aside from the diffusers 19, the pins 20, the filters 12 and the lamp 3, are either of aluminum or of injected metal (zamac).

In operation, depending on the nature and quality both of the film being reproduced and of the sensitive paper used as well as the processes employed, the graduations 8 are set. More specifically, by turning the ring 7, the spring 15 is compressed and the rounded point 14 is caused to move over the ramp 10, i.e., the filter 12 is caused to ascend or descend in front of the channel 9 and the window opening 13 recedes beyond channel 9. In so doing the cross section of channel 9 is obstructed to a greater or lesser extent and filtering is effected.

The subtractive filter of the invention has numerous advantages over the filters being marketed to date. Among these are:
its compactness
its simplicity
its ease of construction
its interchangeability as a function of the films to be reproduced and therefore the possibility of having pre-set assemblies.

Thus, the subtractive filter of the present invention provides an improved device for the printing of color photographic films.

What is claimed is:

1. A subtractive filter assembly for the printing of color photographic film comprising three individually adjustable elementary filter portions through which the light to be filtered passes, each of the three elementary filter portions comprising:
   a fixed cylindrical central portion having at its center a channel for the passage of the light and a radial milled slot on its surface;
   a rotary ring positioned concentrically with said fixed cylindrical central portion, said rotary ring having a graduation on its circular periphery and having an internal surface comprising a logarithmically progressive ramp;
   a filter holder comprising a frame adapted to slide in said radial milled slot in said fixed cylindrical central portion, said frame having a top and bottom, said bottom of said frame having the shape of a rounded point which abuts said ramp, said top of said frame having a spring which rests against said receiving part; said frame of said filter holder having an upper portion comprising a window opening and a lower portion comprising a filter element;
   whereby the positioning of said rotary ring operates to position said filter holder within said radial milled slot to regulate the amount of light passing through said filter element.

2. The subtractive filter assembly of claim 1, wherein for a complete revolution of said rotary ring the difference in pitch of said logarithmically progressive ramp corresponds to the height of said channel for the passage of the light.

3. The subtractive filter assembly of claim 1 or 2, wherein each of said fixed cylindrical central portions has a front face containing said radial milled slot and a rear face comprising a cylindrical base, at least one of said fixed cylindrical central portions having a front face abutting a rear face of an adjacent one of said fixed cylindrical central portions, said cylindrical base having a diameter substantially equal to the outside diameter of said rotary ring.

4. The subtractive filter assembly of claim 3, wherein each filter holder has first and second sides, the first side of each filter holder rests against the bottom of said milled slot on the front face of a corresponding one of said fixed cylindrical central portions and the second side against the rear face of the adjacent one of said fixed cylindrical central portions.

5. The subtractive filter assembly of claim 1 or 2, wherein said channel is rectangular.

6. The subtractive filter assembly of claims 1 or 2, wherein the thickness and width of said frame are equal to the depth and width of said milled slot and wherein the length of said frame having said spring in its compressed state is equal to the length of said milled slot.

7. The subtractive filter assembly of claim 1 or 2, wherein said spring is a spring blade.

8. The subtractive filter assembly of claim 1 or 2, wherein said receiving part has the shape of a secant circular sector.

9. The subtractive filter assembly of claim 1 or 2, further comprising an exposure lamp and a diffuser assembly, rigidly connected to said three elementary filters by fastening screws which pass through said fixed cylindrical central portions.

10. The subtractive filter assembly of claim 9, wherein said diffuser assembly comprises pins adapted to secure the assembly to a lens and to permit the passage of electric current to said exposure lamp.

11. A subtractive filter assembly for the printing of color photographic film comprising a plurality of individually adjustable filter portions, each of said filter portions comprising:
- a fixed central portion having a central aperture, a forward surface and a rearward surface, said forward surface comprising a slot,
- a filter holder located movably within said slot, said filter holder comprising a bottom contact portion, a light transmitting portion and a colored light filtering portion adapted to be moved across said central aperture;
- a rotatable ring concentrically located relative to said fixed central portion, said rotatable ring comprising an internal surface, said internal surface comprising a curved ramp portion which engages said bottom contact portion of said filter holder and causes said filter holder to move within said slot such that said light transmitting portion and said colored light filtering portion are moved across said central aperture as said rotatable ring is rotated;
- means for biasing said filter holder such that bottom contact point is biased into engagement with said curved ramp; said curved ramp having a first point located at a distance from the center of said rotatable ring such that when said bottom contact portion is located at said first point said colored light filtering portion substantially covers the entirety of said central aperture and a second point located at a distance from the center of said rotatable ring such that when said bottom contact portion is located at said second point substantially all of the light passing through said central aperture passes through said light transmitting portion,
- whereby the degree of light filtered by each adjustable filter portion is regulated by the rotation of the corresponding rotatable ring.

* * * * *